UNITED STATES PATENT OFFICE.

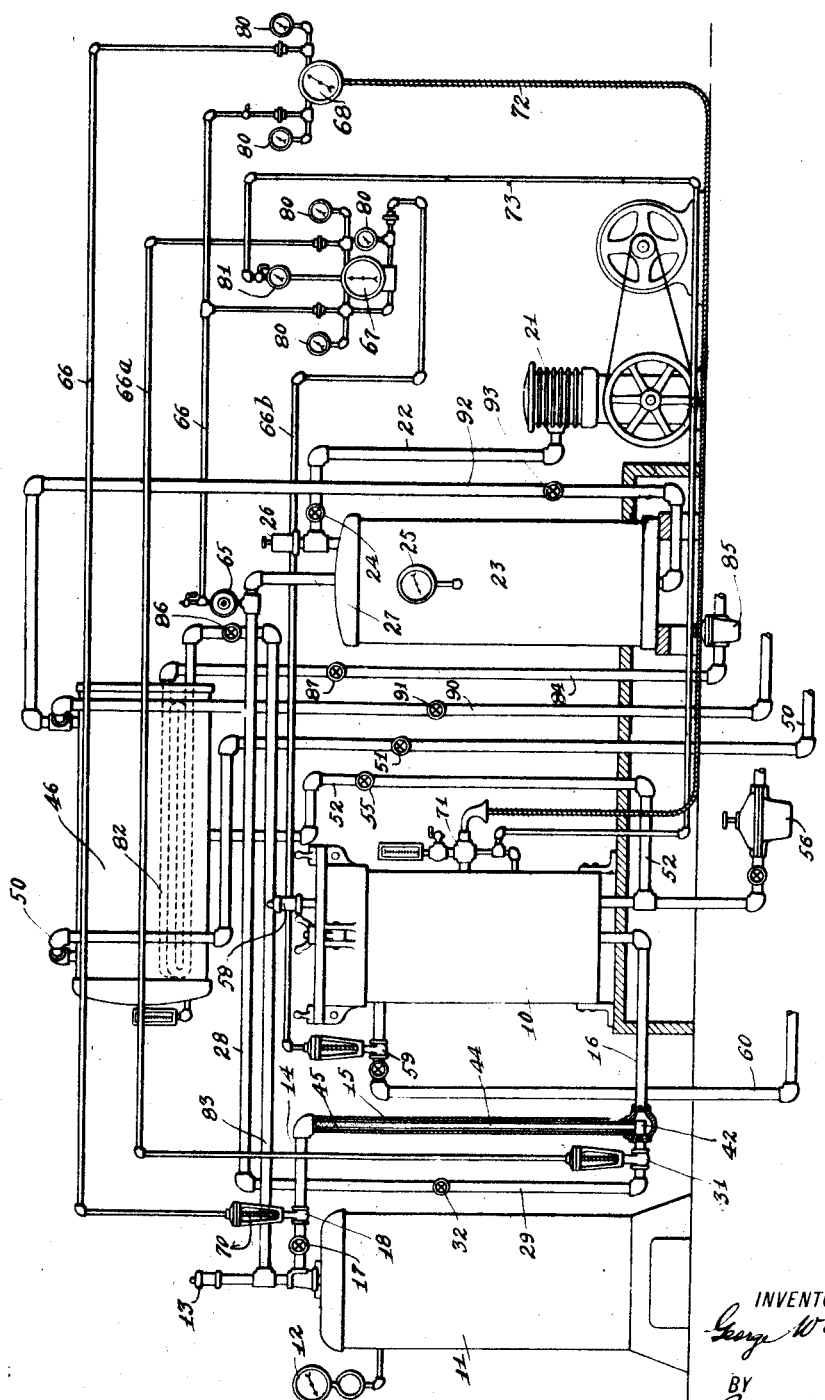

GEORGE W. LUHRMANN, OF JERSEY CITY, NEW JERSEY, ASSIGNOR TO ANCHOR CAP & CLOSURE CORPORATION, OF BROOKLYN, NEW YORK, A CORPORATION OF NEW YORK.

APPARATUS FOR PRESERVING PROCESSES.

1,184,251.  Specification of Letters Patent.  Patented May 23, 1916.

Application filed December 29, 1915. Serial No. 69,171.

*To all whom it may concern:*

Be it known that I, GEORGE W. LUHRMANN, a citizen of the United States, residing at Jersey City, in the county of Hudson and State of New Jersey, have invented new and useful Improvements in Apparatus for Preserving Processes, of which the following is a specification.

This invention relates to apparatus for preserving foodstuffs and the like, and has particular reference to apparatus designed for the processing of foodstuffs packed in individual containers and sterilized under heat applied to the outside of the containers.

The objects of invention include the provision of means for making possible the more efficient and better preservation of foodstuffs; the provision of means to enable foodstuffs to be packed in glass containers, and other objects will appear in the following description and the appended claims.

In the drawings the figure indicates a working apparatus in elevation, partly diagrammatic and partly in section.

The apparatus includes a retort in which the filled and sealed containers are placed, where they are subjected to the action of steam or hot water at a certain sterilizing temperature for a period of time. Up to the present time, such a method of preserving has not been generally successful with glass packages which are ordinarily sealed by a metallic closure and a gasket between the closure and the glass receptacle. The reason why glass could not be used is because the internal pressure of the container caused by the heat of sterilization is so much greater than the pressure of the steam or other fluid used as a heating medium on the outside of the container that it would blow the caps off the glass receptacles in the sterilizing process. Attempts to remedy this by applying temporary mechanical clamps to the containers to prevent the caps from blowing off have been unsuccessful because the container pressure is quite often great enough to blow out the gasket when the cap is clamped to the receptacle. In either case, there is destruction and loss of goods.

In a typical case of preserving meat or fish, it has been found that the containers should be subjected to a sterilizing heat of 240° Fahrenheit for a period of 30 minutes to one hour. If the heating is done by steam or hot water, the pressure of steam in either case at the temperature of 240° Fahrenheit is about 10 pounds gage pressure, or about 25 pounds absolute pressure. The pressure generated by the material within the container at the same temperature, 240° Fahrenheit, is much greater than 25 pounds pressure absolute. Even when the foodstuffs are packed in the receptacle and the air is entirely exhausted from the container just before it is hermetically sealed, and where the absolute pressure within the container at ordinary room temperature is almost zero, such a container when heated to a temperature of 240° Fahrenheit, will develop an internal pressure which will be in the neighborhood of 40 to 45 pounds absolute. Attempts have been made to counteract this excessive pressure by the forcing of compressed air into the retort so as to increase the pressure outside of the containers from that of saturated steam (10 pounds gage pressure) to a sufficient point so that the pressure outside of the container will be greater than that within. These attempts have not been successful, because no suitable means have been provided for controlling the temperature and the pressure within the retort inside of definite limits. If the limits of either temperature or pressure are exceeded in either direction, the goods are either damaged or become a total loss. In the case of temperature, if the temperature drops below a certain point the goods will not be properly sterilized, and they will subsequently spoil. If the temperature rises above a certain limit, the excess heat causes an over cooking of the material, a consequent breaking up or disintegration of the foodstuffs, and where the package is not sealed under a vacuum, the air within the container partially oxidizes the material, discoloring it and injuring its food value. If the pressure drops below a definite limit, the caps will be blown off the containers, or the gaskets blown out, so that the packages are destroyed and the material lost before the process is completed. If the pressure becomes greater than the proper limits, the closure, if of metal, is subject to distortion, the hermetic sealing qualities of the gasket are affected, and "leakers" result, that is, containers in which the seal is partly broken. These "leakers" will pass inspection, but the goods within will deteriorate and sometimes spoil after the packages have been placed on sale.

My invention includes means to reach and to maintain any required definite temperature and pressure that may be necessary, and it may include the provision of automatically operating motor valves to secure this result. It has been found in practice, that it is impossible to maintain the interior of the retort within the required limits of temperature and pressure by admitting steam and compressed air into the retort through different passages which are manually controlled. The compressed air upon entering the retort will expand, which causes its temperature to fall and when this air comes into contact with the steam within the retort, the consequent heating of the air causes its sudden expansion and a great increase in pressure within the retort. These variations in pressure and in temperature are very great. The fluctuations of pressure are so violent and so difficult to control, that such an arrangement has little practical value. In the apparatus herein disclosed, these violent fluctuations are prevented by providing means for effecting a thorough intermingling of the steam and air before they are admitted into the retort, and the said violent fluctuations of temperature and pressure are thus prevented. The improved apparatus is also useful in cases where heat is applied indirectly to the compressed air within the retort, as in the case where the steam or hot water is confined within heating coils and does not come into direct contact with the air. The apparatus further includes an arrangement of valves operating automatically, to confine the temperature and pressure close within the desired limits.

The pressure and the temperature must not only be kept within respective definite limits, but it should be possible to vary the temperature and pressure with relation to each other at will. In the case of foodstuffs such as certain kinds of fish, the temperature should be 240° Fahrenheit and the pressure should be in the neighborhood of 30 pounds gage pressure, or 45 pounds absolute pressure. In the case of other foodstuffs, the same temperature is necessary but the pressure required is only 18 pounds gage pressure, or 32 pounds absolute. Extended experiments have shown that each particular food product may be put up under the best possible conditions at a certain definite temperature, and that a certain definite pressure must be maintained in connection with that temperature in order that the product may be successfully packed and processed in glass. Accordingly, the apparatus is further adapted to be adjusted so that any particular relation between temperature and pressure may be predetermined and provided for.

The retort is shown at 10 and is provided with suitable supply sources of steam, compressed air and water.

A source of steam, or a steam supply is indicated at 11 which shows a steam boiler equipped with the usual gage 12, and safety valve 13. A steam line 14 leads to an enlarged chamber 15 through which the steam flows through conduit 16 into the retort. This steam passage is equipped with hand valve 17, and motor valve 18.

The air supply includes an air pump 21 and delivery pipe 22, passing into a compressed air tank 23, the pipe being provided with hand valve 24; the air tank 23 is also provided with a pressure gage 25 and a safety valve 26. The compressed air passes from the tank through pipe 27, 28, 29, into the retort. This air passage is also provided with motor valve 31 and hand valve 32.

In processing it is important that the air be mixed with the steam before being forced into the retort, in order to prevent sudden and great fluctuations of pressure which arise when cold air is brought into contact with steam. This device includes a compressed air passage 42 opening into a vertical pipe 44 located within the steam or mixing chamber 15. This pipe 44 has a number of perforations 45 at its upper end, through which the air escapes and mingles with the live steam from boiler 11. The steam and air become mixed and flow together downward through the steam chamber 15, and pipe 16 into the retort where they enter at about the same temperature.

The water is supplied to an elevated tank 46 from any suitable source by a pipe 50 having a hand valve 51 and entering the top of the water tank 46. A second water duct 52 leads from the bottom of this tank and passes into the retort 10. This passage is provided with a hand valve 55 and a water trap 56. The retort is provided with a pressure gage 57, and a safety valve 58.

The apparatus for automatically controlling the temperature and pressure in the retort during processing and cooling includes the motor valve 18 in the steam line, motor valve 31 in the air line, and a motor valve 59 located in a blow-off passage 60. These valves are operated in a well known way by pressure diaphragms. These diaphragms operate preferably with an air pressure of 15 pounds steam gage. Air at this pressure is supplied from the tank 23 through pipe 27, pressure reducing valve 65 and passageway 66, communicating with each of the diaphragm chambers. The communication between this passageway 66, carrying 15 pounds air pressure, and the diaphragm chambers is interrupted by adjustable controllers which are indicated respectively at 67 and 68. When these controllers open their valves to admit air pressure to the diaphragms, the respective motor valves are closed against the pressure of their springs 70, and when this pressure is relieved by the reverse movement of the controlling valves, the motor valves 18, 31 and 59 are opened by the pressure of the springs 70. The movement of the valve in controller 68 is determined by the temperature within the retort. A thermostat indicated at 71, is controlled by the internal temperature of the retort and through the tube 72 communicates movement to the controller valve 68 in the well known manner, forming therewith the thermostatic controller.

The controller 67 is of the well known duplex type and is equipped with two valves which govern respectively motor valve 31 and motor valve 59 through the respective connections 66ª and 66ᵇ. In the example given above, when the pressure in the retort reaches 30 pounds the valve of the controller 67 admits compressed air into connection 66ª, thereby closing motor valve 31 and shutting off the supply of compressed air to the retort. Should the pressure in the retort rise higher than 30 pounds, due to the heating effect of steam, the valve controller 67, which governs pipe 66ᵇ, shuts off, allowing the spring of motor valve 59 to open that valve and relieve the pressure in the retort. In other words, with this adjustment, controller 67 will close motor valve 31 when the pressure in the retort is 30 pounds and will open valve 59 when the pressure in the retort rises to 32 pounds. This differential pressure of 2 pounds may be varied within any desired limits, the controller 67 having normally such means of adjustment.

The small gages 80, 80 indicate the pressures in the air lines 66, 66. Gage 81 indicates the pressure in retort 10.

In cooling the containers in the retort after processing, best results can be secured by using relatively warm water for the purpose to avoid the breaking of the glass packages. This water is supplied by the tank 46 and is heated by means of a steam coil 82 located within the tank and connecting through pipe 83 with the boiler 11 and through pipe 84 with the water trap 85, which allows the escape of condensed steam from the coil and maintains a slow circulation in the coil 82. Suitable hand valves 86 and 87 are located in this heating means. A water relief pipe is provided at 90, which is connected with the tank and has a hand valve 91 for opening the passage. A pipe 92 connected with the bottom of the air tank 23, is equipped with hand valve 93 and terminates in the water tank 46.

The normal operation of this apparatus is as follows: Assuming that the foodstuffs within the containers in the retort 10 are to be processed at a temperature of 240° Fahrenheit, and that to prevent the caps from being blown off the containers at this temperature, a pressure of 30 pounds steam gage must be maintained in the retort, or in other words, a pressure 20 pounds greater than the pressure of saturated steam at the temperature of 240° Fahrenheit, the controller 68 is set to open its motor valve at a temperature below 240° Fahrenheit. The controller 67 is set to close motor valve 31 at a steam gage pressure of 30 pounds and to open motor valve 59 at a pressure of 32 pounds. With the containers in place within the retort and the latter sealed, steam and compressed air are admitted through pipe 16 into the retort until the temperature has reached 240° Fahrenheit and the pressure is increased to about 30 pounds gage. These conditions are maintained automatically for the required period of processing, which may be from one-half to two hours. During this time, the temperature is maintained automatically by the thermostatic controller and motor valve 18. The air pressure is normally controlled through pressure controller 67 governing the motor valves 31 and 59. As mentioned above, valve 59 operates with a differential pressure of 2 pounds more than that of valve 31, so that this valve will be closed normally when the retort is under 30 pounds pressure at which time valve 31 is also closed. The purpose of this valve 70 is to permit the admission of steam to the retort, even though the retort be under pressure of 30 pounds, this arrangement being necessary in order to allow steam to flow into the retort should the condition arise in which the retort is under 30 pounds of pressure and its temperature is below 240° Fahrenheit. By means of this differential action of the two valves controlled by the pressure, one valve operating on the air line and the other valve operating on the steam line, the heating effect of the steam can be secured to any desired extent independently of the working pressure in the retort, or the pressure of the air supplied to it. After the processing is completed and the cooling operation begins valve 17 is closed and valve 55 is opened. The predetermined pressure of 30 pounds is still maintained in the retort, but this pressure is now maintained with cold air instead of air heated and mingled with steam. By opening valve 55 a desired amount of water, suitably warmed by coil 82, is admitted into the retort where the spray falls upon the containers to cool them. During this cooling operation the motor valve 31 functions the same as in the processing.

The water for cooling from tank 46 may be used over again as it may be returned from the retort to the tank by closing valve 93, opening valve 91 and admitting compressed air through pipe 16 to force the water upward into the tank through pipe 52.

It will be seen from the time the processing begins until it is completed and the containers are cooled and ready for removal from the retort, that there is a pressure automatically retained within the retort of 30 pounds so that at no time is it possible for the internal pressure of the containers to blow off the caps, or the gaskets.

While the apparatus shown is adapted for processing by the direct action of steam intermingled with air, it is obvious that the retort may be heated indirectly by steam confined within suitable coils within the retort in the well known manner and the invention is not to be restricted to the particular form of apparatus used to illustrate the invention.

I claim:

1. An apparatus for processing foodstuffs and the like, including a retort, a steam supply, a compressed air supply, means for automatically controlling the temperature in the retort by steam, and mechanism for automatically and independently controlling the pressure in the retort by the admission and discharge of compressed air.

2. An apparatus for processing foodstuffs and the like, including a retort, a steam supply, a compressed air supply, means for automatically controlling the temperature in the retort by admitting steam, and mechanism for automatically and independently controlling the pressure in the retort by the admission and discharge of compressed air.

3. An apparatus for processing foodstuffs and the like, including a retort, a supply of heating fluid, a supply of fluid under pressure, means automatically controlling the admission and the discharge of said fluids to and from the retort and adapted to maintain the interior of the retort at a predetermined temperature and at a predetermined pressure, the said pressure being greater than the pressure of saturated steam at the said predetermined temperature.

4. An apparatus for processing foodstuffs and the like, including a retort, a steam supply, a compressed air supply, means for automatically admitting steam into the retort to maintain a predetermined temperature therein, mechanism for automatically controlling the admission and discharge of compressed air to and from the retort to maintain a predetermined pressure within the retort independently and in excess of the steam pressure, the said means and mechanism coöperating to maintain the interior of the retort at a definite temperature and under a pressure that is greater than the pressure of steam used in maintaining said temperature.

5. An apparatus for processing foodstuffs and the like, including a retort, a steam conduit, a compressed air conduit, a blow-off passage, each of said conduits and passage being associated with the retort and respectively equipped with motor valves.

6. An apparatus for processing foodstuffs and the like, including a retort, a source of steam for the retort, a valve for regulating the amount of steam admitted into the retort in accordance with the retort temperature, a source of compressed air for the retort, and valves for regulating respectively the admission and discharge of air into and from the retort in accordance with the retort pressure.

7. An apparatus for processing foodstuffs and the like, including a retort, a steam supply, a compressed air supply, and means for mixing the steam and air before their admission into the retort.

8. An apparatus for processing foodstuffs and the like, including a retort, a steam supply, a compressed air supply, and a mixing chamber to form a mixture of the steam and air before their admission into the retort.

9. An apparatus for processing foodstuffs and the like, including a retort, a steam supply, a compressed air supply, a mixing chamber adapted to mix the steam and air before their admission into the retort, means for controlling the temperature in the retort by varying the amount of steam admitted, and mechanism for controlling the pressure in the retort by varying the amount of compressed air admitted and discharged.

10. An apparatus for processing foodstuffs and the like, including a retort, a steam supply, a compressed air supply, a mixing chamber adapted to mix the steam and air before their admission into the retort, means for controlling the temperature in the retort by varying the amount of steam supplied, and mechanism for controlling the pressure in the retort by varying the amount of compressed air admitted and discharged.

11. An apparatus for processing foodstuffs and the like, including a retort, a steam supply, a compressed air supply, a mixing chamber adapted to mix the steam and air before their admission into the retort, automatic means for controlling the temperature in the retort by varying the amount of steam admitted, and automatic mechanism for controlling the pressure in the retort by varying the amount of compressed air admitted and discharged.

12. An apparatus for processing foodstuffs and the like, including a retort, a steam supply, a compressed air supply, a mixing chamber adapted to mix the steam and air before their admission into the retort, automatic means for controlling the temperature in the retort by varying the amount of steam supplied, and automatic mechanism for controlling the pressure in the retort by varying the amount of compressed air admitted and discharged.

13. An apparatus for processing foodstuffs and the like, including a retort, a steam conduit associated with the retort, a valve located in the steam conduit, a compressed air conduit connected with the retort, a valve located in said conduit, a discharge passage from the retort and a valve located in said passage.

14. An apparatus for processing foodstuffs and the like, including a retort, a water tank located above the retort and connected therewith, an air tank connected with the retort and the water tank, and heating coils located in said water tank.

15. An apparatus for processing foodstuffs and the like, including a retort, a water tank located above the retort and connected therewith, an air tank connected with the retort and the water tank, a steam supply, a water trap, and a heating coil located in said water tank and connected with said steam supply and said water trap.

16. An apparatus for processing foodstuffs and the like, including a retort, a source of steam for the retort, an automatic valve regulating the amount of steam admitted into the retort in accordance with the retort temperature, a source of compressed air for the retort, and automatic valves for regulating respectively the admission and discharge of air into and from the retort in accordance with the retort pressure.

17. An apparatus for processing foodstuffs and the like, including a retort, a steam conduit associated with the retort, an automatic valve located within the steam conduit, a compressed air conduit connected with the retort, an automatic valve located within said conduit, a discharge passage from the retort and an automatic valve located within said passage.

GEORGE W. LUHRMANN.